United States Patent [19]
White et al.

[11] Patent Number: 5,396,490
[45] Date of Patent: Mar. 7, 1995

[54] PACKET REASSEMBLY METHOD AND APPARATUS

[75] Inventors: Richard E. White, Cary; McGrath James D., Wheeling; Dale R. Buchholz, Palatine, all of Ill.

[73] Assignee: Motorola, Inc., Schaumburg, Ill.

[21] Appl. No.: 856,276

[22] Filed: Mar. 23, 1992

[51] Int. Cl.$^6$ ............................................. H04L 12/56
[52] U.S. Cl. ....................................... 370/60; 370/94.1
[58] Field of Search ................... 370/94.1, 60, 60.1, 370/99, 94.2, 95.1, 95.3; 371/32, 33, 35; 455/53.1, 54.1; 379/58, 59, 63, 56

[56] References Cited

U.S. PATENT DOCUMENTS

| | | | |
|---|---|---|---|
| 4,569,042 | 2/1986 | Larson | 370/60 |
| 4,712,214 | 12/1987 | Meltzer et al. | 370/60 |
| 4,755,986 | 7/1988 | Hirata | 370/60 |
| 4,774,706 | 9/1988 | Adams | 370/60 |
| 4,890,280 | 12/1989 | Hirata | 370/60 |
| 4,916,691 | 4/1990 | Goodman | 370/60 |
| 4,922,487 | 5/1990 | Eilenberger et al. | 370/60 |
| 4,951,278 | 8/1990 | Biber et al. | 370/60 |
| 4,975,952 | 12/1990 | Mabey et al. | 370/60 |
| 4,977,556 | 12/1990 | Noguchi | 370/60 |
| 5,008,878 | 4/1991 | Ahmudi et al. | 370/60 |
| 5,101,404 | 3/1992 | Kunimoto et al. | 370/60.1 |
| 5,113,392 | 5/1992 | Takiyasu et al. | 370/94.1 |

*Primary Examiner*—Benedict V. Safourek
*Assistant Examiner*—Ajit Patel
*Attorney, Agent, or Firm*—Val Jean F. Hillman

[57] ABSTRACT

A packet switching system (100) employs packet reassembly hardware (214) in a packet switch (140) to improve overall system throughput during the handling of transmission packets (310) that require reassembly. In this manner, reassembly is accomplished with minimal processor (110) intervention and without having to duplicate the message data portion (312) of a transmission packet (310) into a different memory location prior to retransmission.

13 Claims, 8 Drawing Sheets

N= MAX PACKET ID

| SOURCE LUID | PACKET ID |
|---|---|
| SEQUENCE NUMBER ||
| TOTAL NUMBER OF FRAGMENTS | FRAGMENTS RECEIVED |
| TOTAL PACKET LENGTH ||
| PROTOCAL ||
| PROTOCAL ||
| PROTOCAL ||
| PROTOCAL ||
| PROTOCAL ||
| PROTOCAL ||
| PROTOCAL ||
| PROTOCAL ||
| INTERRUPT CONTROL ||
| RECEIVED FRAGMENT BITMAP POINTER (DATA MEMORY) ||
| DATA FRAGMENT POINTER 0 (DATA MEMORY) ||

⋮

| DATA FRAGMENT POINTER M (DATA MEMORY) |
|---|

M=MAXIMUM FRAGMENT NUMBER

PACKET REASSEMBLY METHOD AND APPARATUS

FIELD OF THE INVENTION

This invention is generally directed to a packet switching system in which data is transmitted by packets and is more specifically directed to a method and apparatus for referencing, storing and reassembling data, segregated into smaller packets, back into an original configuration.

BACKGROUND OF THE INVENTION

Packet data networks convey information from an originating device to a specified addressee by incorporating the information into packets. Each packet contains a preamble (control data) and information (message data). The preamble typically includes packet network control data, synchronization information and addressee destination information. The information portion contains the originating device's message.

The packet originated by the originator is typically not directly received by the addressee. The packet may be relayed by several intermediate stations before reaching the final addressee destination. As the transmission speeds of packet networks increase, it becomes increasingly important for relay stations to be able to efficiently handle and process packets.

In a direct method for handling packets, received packets are stored in a memory location. The destination of the packet contained at the preamble is checked as well as other packet network control information. Correct receipt or validation of the control information and the packet data information is checked. Assuming no errors are detected, a new packet corresponding to the received packet is created and stored in a different memory location for retransmission. At the appropriate time, the reconstituted packet is retransmitted by the relay station towards its final destination.

Packets are handled in a different manner in an Ethernet local area network. A buffer ring structure comprised of a series of contiguous fixed length byte buffers are utilized for storage of received packets. The beginning and end location of the stored packet is identified by addresses held in a page star and a page stop register. Successive buffers in the ring are utilized to store the packet. Multiple packets can be consecutively stored in the ring structure. The packets are normally removed from the receive buffer ring in FIFO order and are reconstituted in memory separate from this ring, prior to retransmission. Each of these steps are typically performed under the direction of the system's central processor.

On occasion the information (message data) portion of a data packet originated by an originating device is too large to fit into the message data portion of packets utilized by an intermediate relay station. In such instances the original data packet must be separated into N fragments prior to transmission by said intermediate relay station. Upon receipt, each of the N fragments must be reassembled in the correct order in order to recreate the original information data packet.

It will be appreciated that the handling of fragmented data packets adds additional strain on the processing resources of a receiving station attempting to validate correct reception, determine whether each fragment has been received, store each fragment in memory and reformulate new fragments corresponding to the received fragments, prior to their retransmission. It would be extremely advantageous therefore to provide an improved method for organizing and handling packets requiring reassembly that minimizes processor intervention as well as eliminates intermediate data transfers to additional memory locations prior to the reassembly and retransmission of information contained in an original data packet.

SUMMARY OF THE INVENTION

Briefly described, the present invention is a method and apparatus for handling packets that require reassembly. In this effort a packet switch employs a receiving device to receive a plurality of packets. Thereafter, a switching device is used to determine which of the received packets require reassembly. Upon this determination, packet reassembly hardware is employed to combine the message data portions of those packets that require reassembly. Upon completion, the control processor is informed that reassembly is complete. In this manner, reassembly is accomplished with minimal processor intervention and without having to duplicate the message data portion of each packet into a different memory location prior to retransmission.

DETAILED DESCRIPTION OF A PREFERRED EMBODIMENT

Before describing an embodiment of the present invention, it is believed that an overview of the invention will aid the reader's understanding. The problems identified in handling fragmented packets in a packet switching system are minimized, if not overcome, by the present invention which allows fragments to be reassembled from information stored in segregated memory locations by providing a hierarchy of addressability. This hierarchy provides a great level of flexibility in defining or redefining a fragment without data duplication in multiple memory locations. In addition, the proposed hierarchy of addressing permits the storage and reassembly of fragmented data packets without excessive strain upon system processing resources. The control processor of the present invention is typically only involved in the reassembly of the first and the last received fragments of each fragmented data packet.

Figure 1:
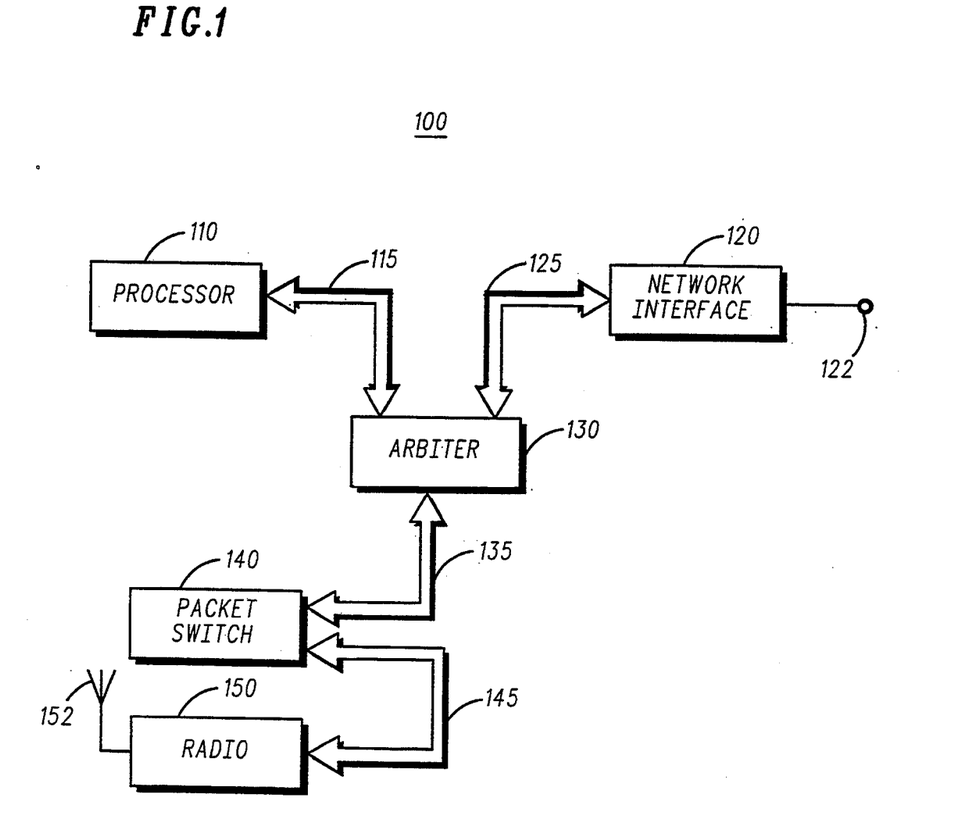
FIG. 1 is a block diagram of an exemplary packet switching system in accordance with the present invention.

FIG. 1 illustrates a block diagram of an embodiment of a packet switching system 100 capable of originating, receiving, and relaying information over a packet network. This system includes a central processor 110, network interface device 120, bus arbiter 130, packet switch 140 and a radio 150 with antenna element 152. The central processor 110 and the network interface device 120 are shown connected to the bus arbiter 130 via buses 115 and 125, respectively. In practice, the central process 110 includes associated random access memory, read only memory, control logic and necessary control logic drivers to control and direct switching system 100 operation.

The switching system 100 is depicted as having an network interface device 120, for providing switched access to and from an external information network via terminal 122. In accordance with the preferred embodiment, the network interface device 120 is an Ethernet network interface device for providing access to an Ethernet local area network (LAN). Notwithstanding, it will be appreciated by those skilled in the art that the network interface device 120 can be any of the other well known interface devices capable of interpreting data supplied by other packet network protocols such as, for example, an RS232 format, a token ring format, and an IBM 3270 format as well as other forms of data communication.

The packet switch 140 is connected to the processor 110 and the network interface device 120 via a communications bus 135 and a bus arbiter circuit 130. By design, the bus arbiter 130 is used to arbitrate access to the packet switch 140 from between the processor 110 and the network interface device 120, thereby facilitating data packet transfers between the packet switch 140 and either the processor 110 or the information network via the network interface device 120. Accordingly, the bus arbiter 130 consists of available integrated circuit translators, registers and line drivers for selective communications with a bus plurality, shown as buses 115 and 125, seeking access to the packet switch 140. Communications buses 115, 125 and 135 may comprise any of the well known bi-directional communications buses employed in the art.

A radio 150 having at least one antenna element 152 is coupled to the packet switch 140 via a packet switch bus 145 in order to communicate data in the form of packets to and from intermediate relay stations via radio frequency (RF) channels. The physical structure of the packet switch bus 145 is described in U.S. patent application Ser. No. 07/719,212, filed Jun. 21, 1991 and assigned to the assignee of the present application. While only a single radio is shown connected to the packet switch bus 145, a plurality of communication devices, suited for coupling different communications networks to the packet switch 140 can be utilized. For example, devices such as a telephone, a T1 circuit, an ISDN circuit as well as other devices and networks are suitable for connection to the packet switch bus 145 and ultimately the packet switch 140. As will be appreciated, the purpose of packet switch 140 is to receive and transmit packetized data among devices on the packet switch bus 145. It also communicates via communications bus 135, bus arbiter 130 and communications bus 115 with the central processor 110. Communications with devices coupled to the network interface device 120 are routed over the communications bus 125 as shown.

Figure 2:
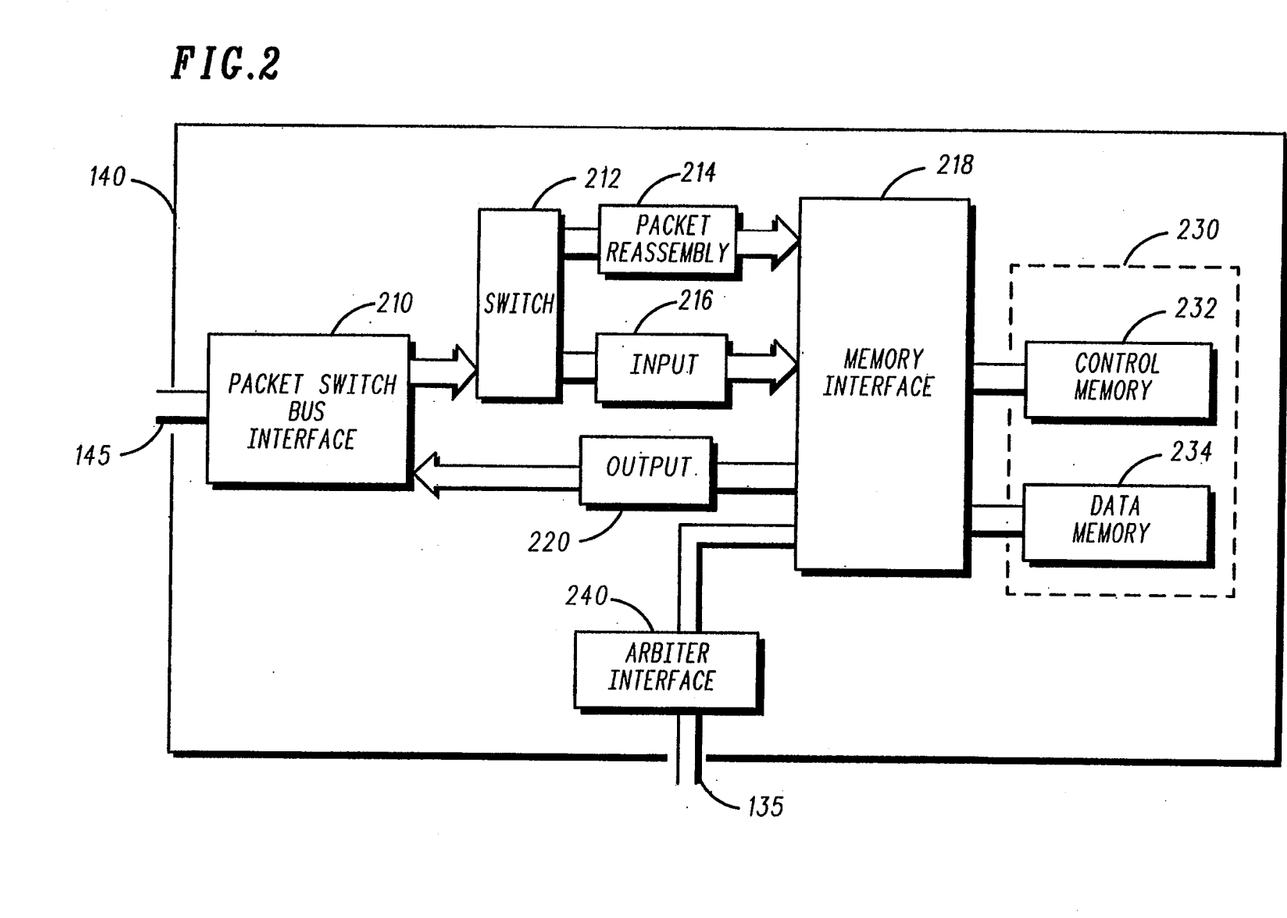
FIG. 2 is a block diagram of the packet switch as shown in FIG. 1.

FIG. 2 illustrates a block diagram of an exemplary packet switch 140 which includes elements connected by bi-directional buses. An arbiter interface 240 couples the arbiter circuit 130 of FIG. 1 to memory interface 218 via the communications bus 135. The memory interface 218 is coupled to random access memory 230 which is partitioned into control memory 232 and data memory 234. It will be appreciated by those skilled in the art that this partitioning can be either physical or logical.

During operation, packets received by the packet switch 140 over the packet switch bus 145 are stored in appropriate memory locations within memory 230. Data memory 234 stores received data packets (message data), while control memory 234 contains the control structures which control the basic operation of the packet switch 140. The packet switch bus 145 and the devices connected thereto are coupled by packet switch bus interface 210, switch 212, packet reassembly hardware 214 or input control function 216, and output control function 220 to the memory interface 218.

As previously stated, when the information (message data) of a data packet originated by an originating device is too large to fit into a single transmission packet, the original information must be separated into N fragments. Upon receipt by the radio 150 of FIG. 1, the transmission packets containing these fragments must be received, validated and reassembled, prior to data packet retransmission back out over the radio 150 or over the Ethernet network via network interface device 120.

In order to improve overall system throughput and lessen the strain on the switching system's processing resources, the packet switch 140 employs reassembly hardware 214 during the handling of transmission packets containing fragments that require reassembly. Input control function 216 is employed during the processing of transmission packets which do not require reassembly. In either event, the packet switch 140 performs transmission packet handling and reassembly with minimal processor 110 intervention and without requiring message data duplications.

This is generally accomplished by utilizing a hierarchy of addressability wherein received transmission packets requiring no reassembly are disassembled and stored in segregated memory locations under the control of the input control function 216. For additional discussion on this approach, the interested reader may refer to pages 28–34, FIGS. 18–24 and claims 44–64 of U.S. patent application Ser. No. 07/719,212, filed June 21, 1991 and assigned to the assignee of the present application. When, on the other hand, a received transmission packet is identified as one requiring reassembly, reassembly and storage into segregated memory locations is provided under the direction of the packet reassembly hardware 214 with minimal processor intervention. Thereafter, the data to be retransmitted back out over the radio or over the communications network is assembled by sequentially addressing the segregated memory location, without performing the intermediate step of duplicating the received transmission packer's message data.

Since various types of packet switches are known in the art, the specific operation and details of the internal functioning of the packet switch 140 will not be explained. Suffice it to say, however, that the switch 212 of packet switch 140 determines whether a received transmission packet requires reassembly. Upon this determination, packet handling is switched to the appropriate control function. In general, the functions of the packet switch 140 can be accomplished by a software implementation or in hardware by a state machine or gate array implementation.

Figure 3:
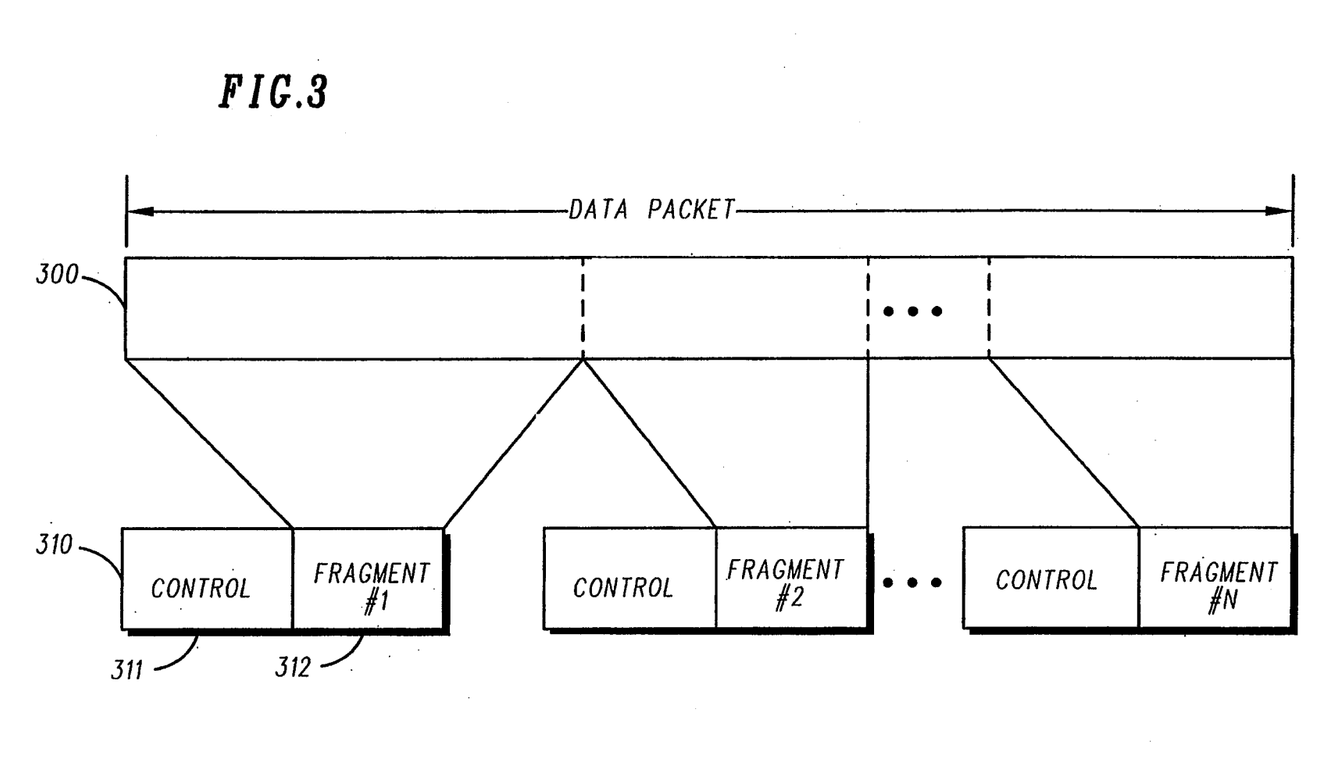
FIG. 3 illustrates the relationship between information in a data packet format and its correspondence to information represented in a transmission packet.

FIG. 3 illustrates the relationship between information in a data packet format, like that employed to communicate information over the external data network via the Network Interface device 120 of FIG. 1, and its correspondence to the information communicated in a transmission packet format, like that communicated over RF channels by the radio 150 of FIG. 1. In this effort, a data packet 300 comprises originating device control and message data. As previously stated, when the data packet 300 is too large to fit into the limited confines of a single transmission packet 310, the data packet is separated into N fragments. As shown, each fragment is formatted into a separate transmission packet 310. Each transmission packet 310 comprises control information 311 and a fragment field 312 where portions of the data packet 300 are contained. When received by radio 150, the plurality of fragments 1-N comprising data packet 300 must be reassembled, prior to communication over the external data network via Network Interface 120 of FIG. 1 or retransmission to an intermediate relay station. Of course, where the entire data packet 300 can be placed into a single transmission packet 310, it will be.

Figure 4:
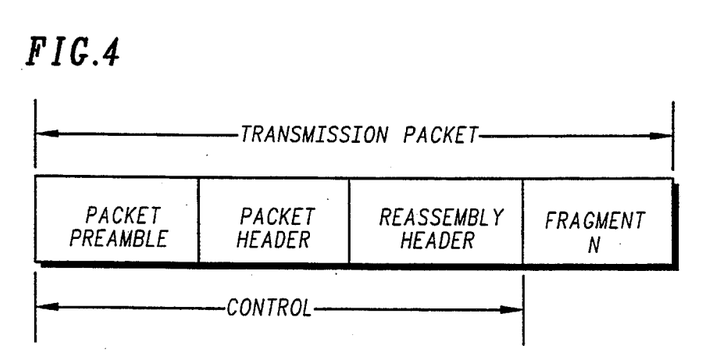
FIG. 4 illustrates the information contained in the control portion of a transmission packet as shown in FIG. 3.

FIG. 4 illustrates the information contained within the control section of a transmission packet requiring reassembly, in accordance with FIG. 3. The format illustrates the transmission of packet preamble information, a packet header, a reassembly header and a fragment field. The packet preamble is provided for radio receiver 150 synchronization purposes. The packet header and the reassembly header will be explained in more detail below. As previously suggested, the fragment field contains a portion of the data packet 300 that is to be communicated between users.

Figure 5:
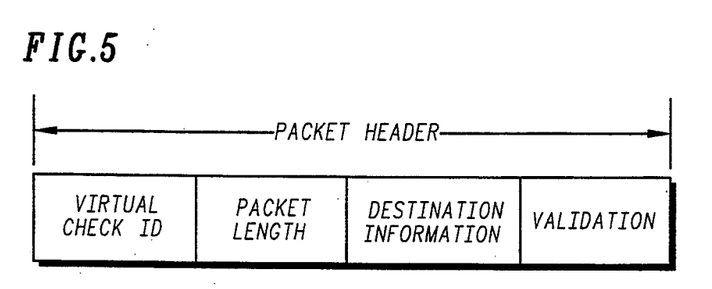
FIG. 5 illustrates the information contained in the packet header as shown in FIG. 4.

FIG. 5 illustrates the information contained within the packet header as shown in FIG. 4. It also represents the extent of the control data portion of a transmission packet that does not require reassembly. The packet header includes a virtual circuit identification (ID), packet length information, destination information, and validation information. The virtual circuit ID contains information that specifies a virtual circuit register contained within packet switch 140. The virtual circuit register points to or addresses a queue control block which in turn points to read and write packet descriptors which can point to an additional packet descriptor, as well as to read and write buffer descriptors. The buffer descriptors each point to a write buffer and to a next read and write buffer descriptor, thereby forming a chain or link of addresses for defining which buffer location the message data portion of a received transmission packet not requiring reassembly will be stored. For further information on this process, the interested reader is once again referred to U.S. patent application Ser. No. 07/719,212, filed Jun. 21, 1991 and assigned to the assignee of the present invention. The packet length provides information concerning the length of the associated packet. The destination information includes destination device address information. The validation information contains data associated with a CRC data accuracy calculation.

In accordance with the present invention, the most significant bit (MSB) of the virtual circuit ID is used to identify a transmission packet requiring reassembly. If the MSB of the virtual circuit ID is a '0', the transmission packet is switched by switch 212 of FIG. 2 to the input function 216, whereby the reassembly hardware 214 is avoided. If, on the other hand, the MSB of the virtual circuit ID is a '1' packet handling control is switched to the packet reassembly hardware 214 of FIG. 2. The lower seven bits of the virtual circuit ID are used as a reassembly identification (ID). The reassembly ID contains information that specifies a reassembly register contained within the packet switch 140. Further information on this element is provided with regard to the following figures.

Figure 6:
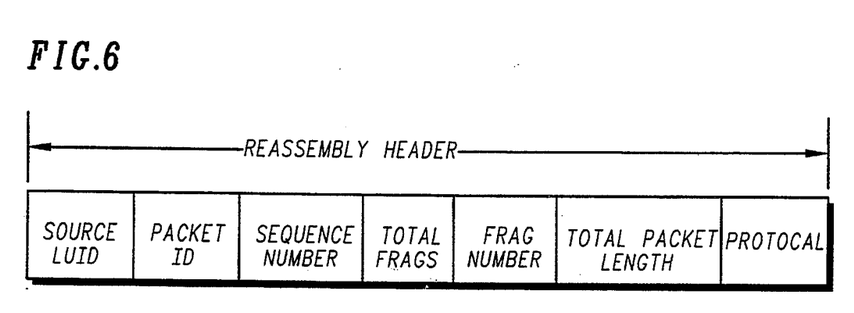
FIG. 6 illustrates the information contained in the reassembly header as shown in FIG. 4.

FIG. 6 illustrates information contained within the reassembly header of the transmission packet of FIG. 4. The reassembly header is only found on transmission packets that require reassembly. By design it includes a source logical unit identification (LUID), packet identification (ID) field, sequence number field, total fragment field, fragment number field, total packet length field and a protocol field. The source LUID defines the logical unit identification of the originating device.

The sequence number and the packet ID, in combination, are used to provide a unique ID for each data packet. The packet ID field identifies a data packet from a particular originating device to which the received fragment is associated. The sequence number field is used when a packet ID number is being reused by an originating device in order to associate the reused packet ID with a different data packet. The total fragment field defines the total number of fragments comprising the data packet in question. The fragment number defines which of the fragments is being received, while the total packet length defines the length in bytes of the data packet as reassembled. Finally, the protocol field is used by the central processor to maintain the proper data packet ordering and to schedule acknowledgements as known by those skilled in the art.

Of note, the fragment number is not stored in control memory along with the other reassembly header information, but is instead used to direct the storage of the fragment in data memory.

Figure 7:
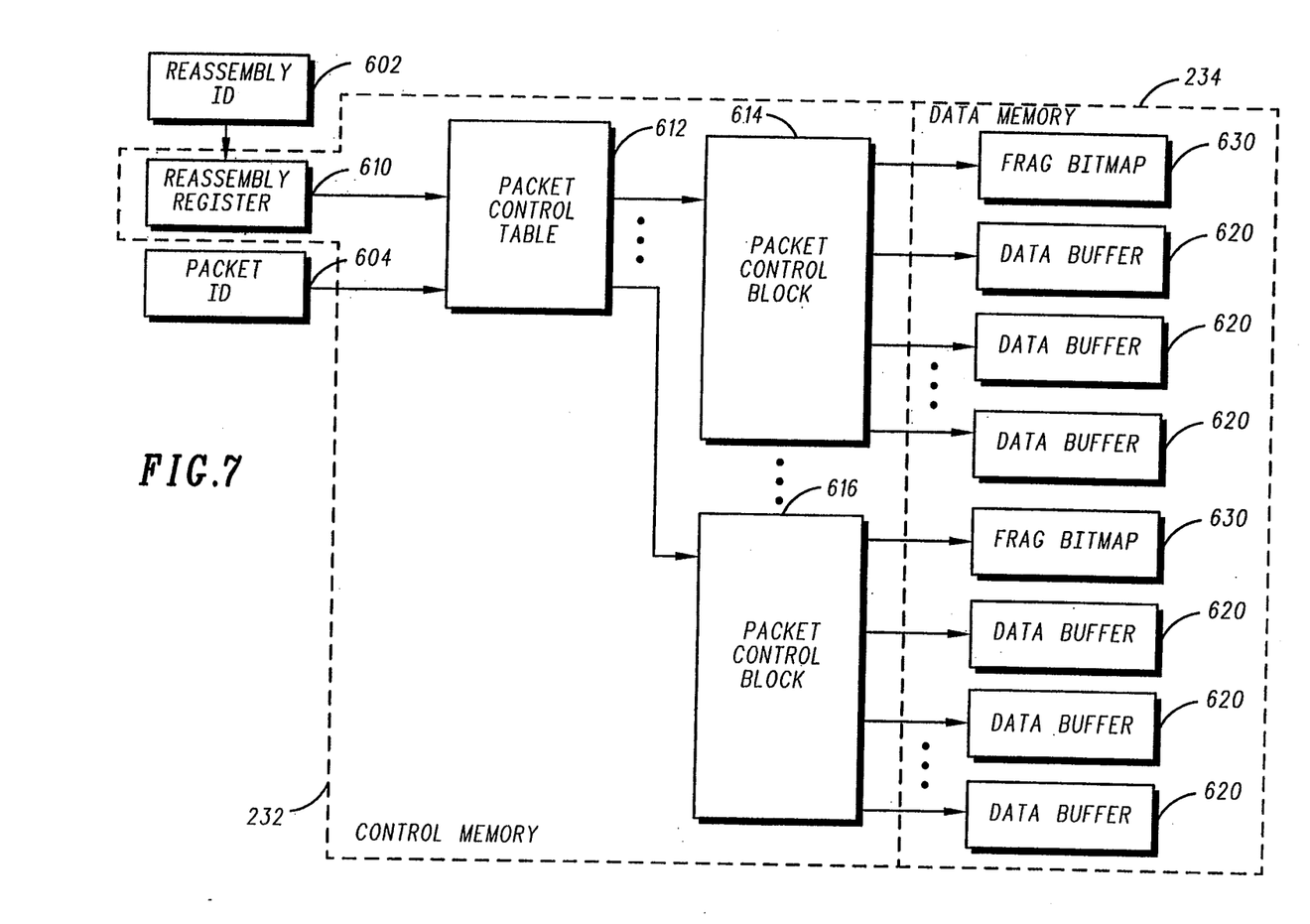
FIG. 7 is a diagram representing the control structure of the packet reassembly 15 hardware of FIG. 2 in accordance with the present invention.

FIG. 7 illustrates an exemplary packet handling and organization method according to the present invention. In the illustrative embodiment of the present invention, the fragments as identified in FIG. 3 are stored in data buffers 620. These buffers constitute sections of the data memory 234 of FIG. 2. The control memory 232 of FIG. 2 provides storage for the control fields associated with the reassembly header shown in FIG. 6. These elements facilitate a method for organizing and reassembling fragments according to a hierarchical approach.

In this effort, the reassembly ID 602 obtained from the virtual circuit ID within the packet header of FIG. 5 is used to point to one of a plurality of reassembly registers 610 stored in control memory 232. This plurality of reassembly registers permits the reassembly of data packets from multiple originating devices, simultaneously. As depicted a reassembly register points to or addresses a packet control table 612. In concert, the packet ID 604 received within the reassembly header of FIG. 6 identifies which entry in the packet control table is to be used. It should be noted that each reassembly register 610 addresses a unique packet control table 612. This allows multiple data packets from the same originating device to be reassembled simultaneously.

The packet control table 612 points to or addresses the packet control block 614, 616 being used for the specified packet ID 604. Since there can be several packet IDs from a single originating device, a single packet control block is provided for each data packet being reassembled. The packet control block is therefore the point where all information concerning data packet reassembly is collected. Of note, packet control blocks 614–616 are shared resources. There is a queue of available packet control blocks for storing information regarding a newly received data packet. The packet switch 140 of FIG. 2 takes a packet control block out of this queue when needed. The central processor 110 of FIG. 1 is responsible for returning it back to the queue when the reassembly process is complete.

Each packet control block points to data buffers 620 as well as a fragment bit map 630, each having a separate and distinct memory location (address). The fragment bit map 630 is a map of the fragments that have been successfully received for a specified data packet. Each bit map is updated as additional fragments are received. The data buffers 620 are the locations within data memory 234 where the fragments, message data portions of each received transmission packet, are stored.

Before further explaining the functioning of these elements it is believed that an explanation of the benefits of this organization will assist in comprehending the organization and function of each element. An important aspect of this invention is to provide an improved level of flexibility in defining and redefining fragments with minimal central processor intervention, thereby increasing overall system throughput. This is generally accomplished by providing a hierarchy of addressability wherein central processor action is not consistently required during the reception, validation, referencing, reassembly and storage of received fragments into segregated memory locations. Thus, minimal processor intervention can be defined in terms of the extent of the processor's participation in the reassembly of a fragmented data packet. The fewer steps performed by the central processor which direct reassembly activities, the less substantial the processor's intervention.

Figure 8:
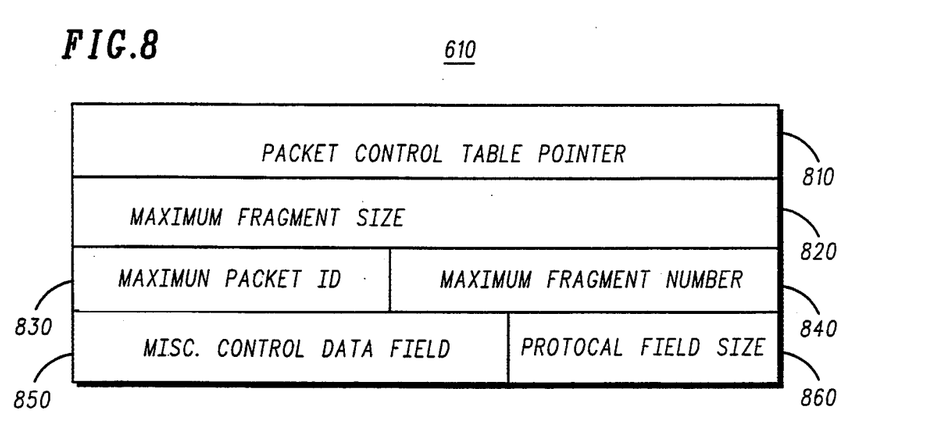
FIG. 8 illustrates the contents and format for the reassembly register as shown in FIG. 7.

FIG. 8 illustrates an exemplary embodiment of the contents of the reassembly register 610 of FIG. 7. As illustrated, it includes a packet control table address pointer 810, maximum fragment size information 820, maximum packet identification (ID) field 830, maximum fragment number field 840, miscellaneous control data field 850 and a protocol field size 860. The packet control table pointer 810 points to the packet control table 614–616 of FIG. 7, being used for this particular reassembly register 610. As previously stated, each reassembly register has its own packet control table. The maximum fragment size field 820 identifies the largest fragment that can be received for a given reassembly register. This can be utilized as a safeguard to keep a fragment from over-writing memory.

In this effort the packet length field in the packet header of FIG. 5 is compared to the maximum fragment size. If the packet length is greater than the maximum fragment size, an error is generated and the fragment is not stored. The maximum packet ID field 830 is used to determine the maximum number of packets that can be simultaneously reassembled from a single source. This field is compared against the packet ID in the reassembly header of FIG. 6. If the packet ID is greater than the maximum packet ID, an error is generated and the fragment is not stored.

The maximum fragment number field 840 is used to determine the maximum number of fragments a data packet can have. In this effort the maximum fragment number field 840 is compared against the fragment number field in the reassembly header of FIG. 6. If the fragment number is greater than the maximum fragment number, an error is generated and the fragment is not stored. The protocol field size 860 defines the length of the protocol field in the reassembly header of FIG. 6. Finally, the miscellaneous control data field 850 can be utilized to accommodate additional control information which may be useful for a specific implementation of a method in accordance with the present invention. For example, the miscellaneous control data field 850 can track which errors are registered or control whether the packet reassembly process is enabled or disabled.

Figure 9:
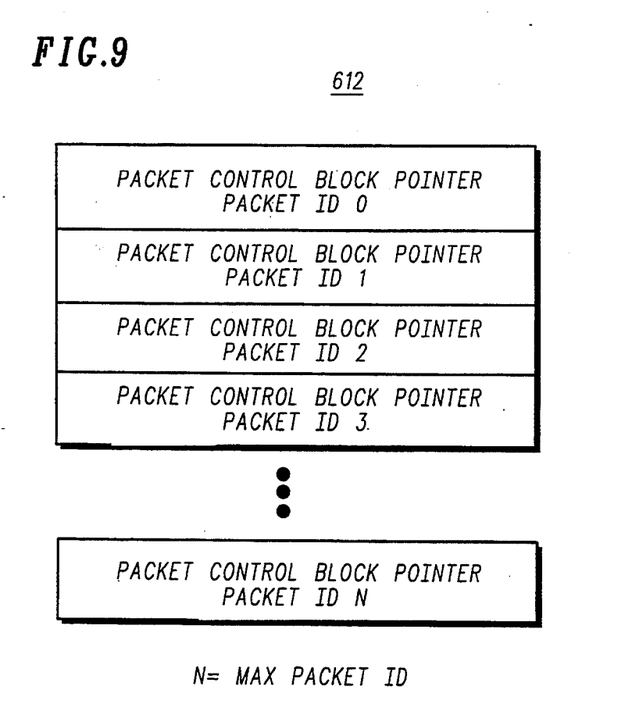
FIG. 9 shows the content and format of the packet control table as shown in FIG. 7.

FIG. 9 illustrates the fields associated with the packet control table 612 of FIG. 7. As previously stated, a packet control table is used to control the reassembly of one or more data packets each having the same reassembly ID. Notwithstanding, each packet ID for a given reassembly ID has its own entry in the packet control table. Thus, each packet control table entry contains a packet control block pointer which points to the packet control block being used for the specific packet ID. During operation, the packet reassembly hardware 214 of FIG. 2 will store the pointer when it gets a packet control block from the pool. Conversely, the control processor will null this pointer when reassembly is complete.

Figure 10:
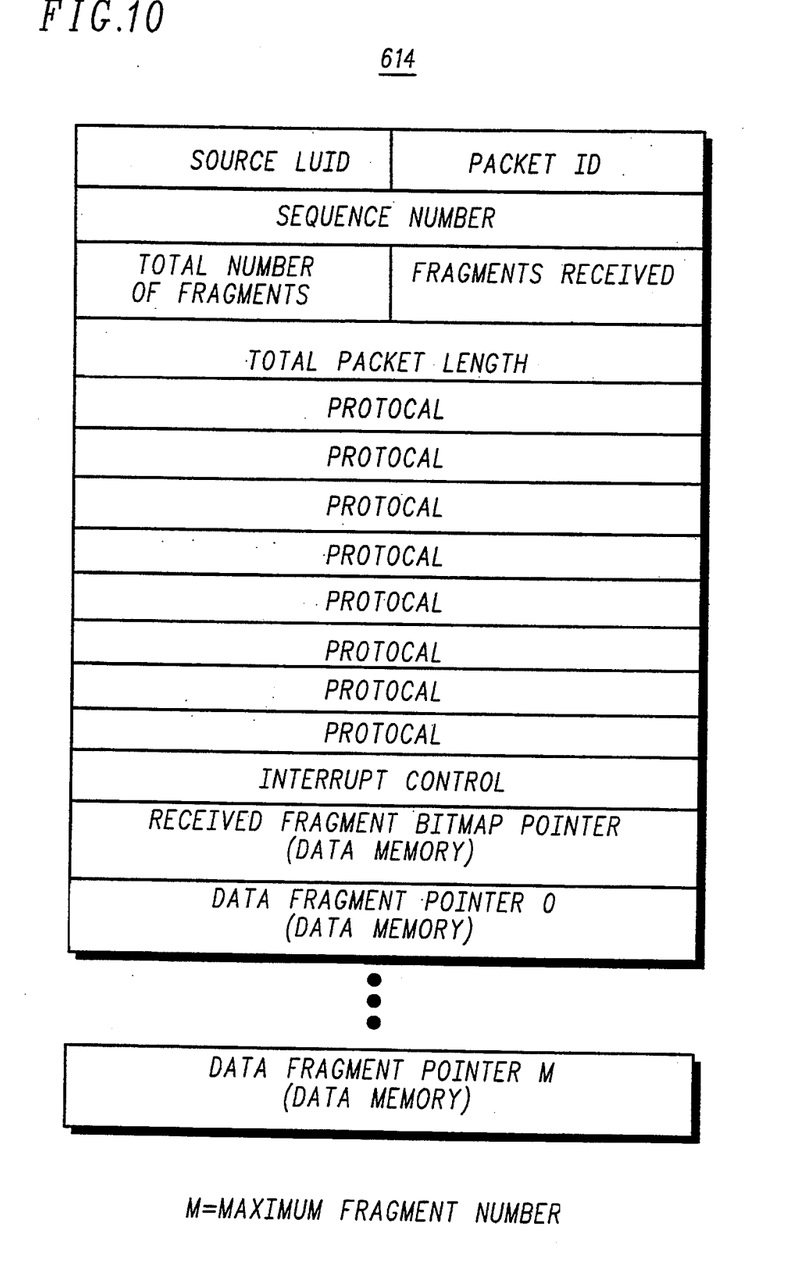
FIG. 10 shows the contents and format of a packet control block as shown in FIG. 7.

FIG. 10 illustrates the fields associated with the packet control block 614 of FIG. 7. As previously suggested the packet control block is used to collect all relevant control information for a data packet. Accordingly, a packet control block consists of a source LUID, packet ID field, sequence number field, total fragment number field, fragment received field, total packet length field, a plurality of protocol fields and an interrupt control field, in addition to a fragment bit map pointer and a plurality of data fragment pointers. It will be appreciated by those skilled in the art, that most of the information found in the packet control block is taken directly from the reassembly header of a received transmission packet in accordance with FIG. 6. Of note, this information is taken from the first received transmission packet from within the plurality comprising the data packet, regardless of the first received transmission packet's fragment number. Once the control information is stored in the packet control block, only the source LUID for a later received transmission packet is compared to the information residing in the reassembly header. If there is a miscompare, the transmission packet's fragment will not be stored in connection with this packet control block.

As it suggests, the fragment received field is simply a count of the number of fragments successfully received. If duplicate fragments are encountered, they are not added to the count. This field is ultimately compared to the total number of fragments field to determine when the complete data packet has been received.

The received fragment bit map pointer points to a bit map of received fragments. Each bit map 630 of FIG. 7 is stored in the data memory 234 of FIGS. 2 and 7. When a fragment is successfully received, the bit map bit corresponding to that fragment is set to a logic '1'. As previously mentioned, the fragment number found in the reassembly header of FIG. 6, while not stored, is nonetheless used to index into the received fragment bit map. If the bit map is larger than the total number of fragments received, unused bits will remain unchanged.

The data fragment pointer fields, numbered 0–M with M equalling the maximum number of fragments allowed, point to data buffers 620 of FIG. 7. There is a single data buffer for each received fragment. Of note, each data buffer is a shared resource. When the reassembly hardware 214 of FIG. 2 determines that it needs a data buffer, it will take a data buffer pointer from a data buffer queue. This pointer will be stored in the packet control block for association with the received fragment. When the data buffer used to store a fragment is no longer in use, the central processor will return it to the data buffer queue.

The protocol fields are strictly used by the central processor 110 of FIG. 1. Reassembly hardware 214 of FIG. 2 does not use any of the information within the protocol fields during the reassembly process, it merely stores the information in the appropriate packet control block. Suffice it to say, however, that the protocol fields comprise sequence numbers, acknowledgement scheduling information and miscellaneous controls used by the central processor 110 in order to provide data packet ordering and to assist in the routing and scheduling of acknowledgements as is well known in the art.

The interrupt control field is used to control central processor interrupts. Examples of common interrupts that the packet reassembly hardware 21 4 of FIG. 2 can generate are the, Packet Start, Packet Complete, Sequence Number Change, and Next Fragment interrupts. As will be appreciated, an interrupt bit in the status section of an interrupt queue entry will be set to indicate which event caused the interrupt. The interrupt control field of the packet control block contains bits to enable and disable each interrupt.

Figure 11:
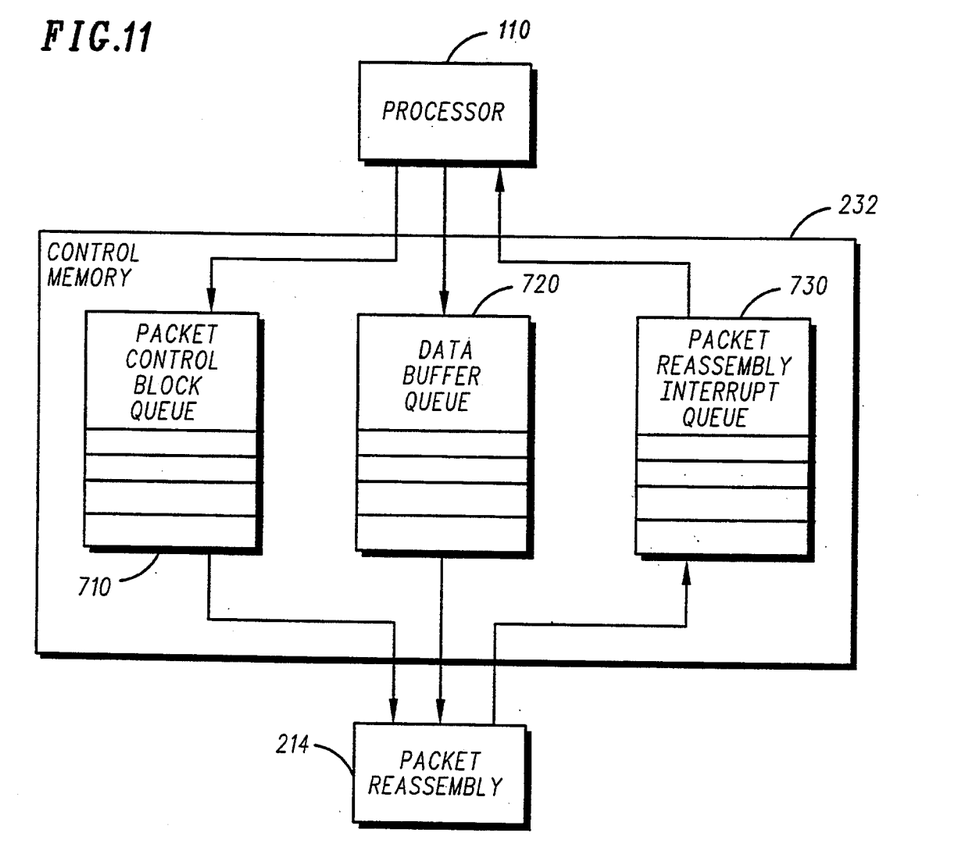
FIG. 11 shows the interface scheme between the processor of FIG. 1 and the packet reassembly hardware as shown in FIG. 2.

FIG. 11 shows the interface scheme between the processor 110 of FIG. 1 and the packet reassembly hardware 214 as shown in FIG. 2. It consists of three manageable entities: a packet control block queue 710; a data buffer queue 720; and a packet reassembly interrupt queue 730, each maintained within the control memory 232 of FIGS. 2 and 7. The central processor 110 is responsible for placing addresses for the available packet control blocks and data buffers into the packet control block queue 710 and the data buffer queue 720 as they become available. The packet reassembly hardware 214 will then extract a packet control block or a data buffer pointer from the appropriate queue as needed during reassembly.

The packet reassembly interrupt queue is used by the packet reassembly hardware 214 to interrupt the processor 110 when so commanded by the interrupt control field of the packet control block 614–616 in question. Interrupts are initiated by the reassembly hardware placing entries into the interrupt queue. Such entries comprise at least the address of the packet control block 614–616 in question and the interrupt status. Of note, several entries may be handled by the processor during a single interrupt.

In this effort, the Packet Start interrupt is generated when a fragment of a new data packet is first received, regardless of the fragment's fragment number. In return, the central processor will set a reassembly timer within which time all fragments associated with the newly received data packet must be received, else reassembly will be aborted. If the Packet Start interrupt is enabled, an interrupt is generated by placing the address of the packet control block and the interrupt status in the packet reassembly interrupt queue 730. Of note, the interrupt is not generated until the fragment has been completely received and the packet control block has been updated.

The Packet Complete interrupt is generated when all fragments of a fragmented data packet are received and the Packet Complete interrupt is enabled. In response the central process will direct the retransmission of the reassembled data packet in accordance with the dictates of the destination information within the data packet. Of note, the last fragment received does not have to be the Nth fragment of a data packet with N fragments. The first time a fragment is received, the fragment received field in the packet control block is incremented. When the fragment received field is equal to the total number of fragments count and if the Packet Complete interrupt is enabled, the Packet Complete interrupt is generated by placing the address of the packet control block and the interrupt status in the packet reassembly interrupt queue.

Of note, the interrupt is not generated until the fragment has been completely received and the packet control block has been updated. Of additional importance, the two previously mentioned interrupts (Packet Start and Packet Complete) typically represent the extent of the processor's intervention in the reassembly process of the present invention. Thus, minimal processor intervention during reassembly is defined as processor action upon the first and the last received fragment of a fragmented data packet comprising N fragments. Of course, for those data packets where N equals one (1), the first received fragment is also the last received fragment. In that instance a combined Packet Start and a Packet Complete interrupt will issue as a result of receipt of a single fragment.

The Sequence Number Change interrupt is generated when the sequence number in the reassembly header of a received transmission packet having a packet ID is not equal to the sequence number stored in the packet control block associated with the packet ID, all fragments associated with the previous data packet have not been received and the Sequence Number Change interrupt is enabled. When a transmission packet is received, the sequence number in the packet reassembly header is compared to the sequence number stored in the packet control block associated with the packet ID. If the numbers are different and this is not the first fragment received, the Sequence Number Change interrupt bit in the interrupt status is set. If the Sequence Number Change interrupt is enabled, an interrupt will be generated by placing the address of the packet control block for the packet with the former Sequence Number and the interrupt status in the packet reassembly interrupt queue. The packet reassembly hardware 214 will then get a new packet control block from the appropriate queue and proceed to reassemble associated fragments per the description provided herein.

The Next Fragment interrupt is generated when the Next Fragment interrupt in the packet control table is enabled. This interrupt is typically used when the retransmission of fragments is required. Thus, this interrupt can be used to inform the processor to schedule the acknowledgments for the retransmission of the missing information. If the Next Fragment interrupt is enabled, an interrupt will be generated by placing the address of the packet control block and the interrupt status in the packet reassembly interrupt queue. The Next Fragment interrupt bit in the packet control block is disabled by the packet reassembly hardware after the interrupt is generated.

It will be apparent to those skilled in the art that there are many methods by which the central processor can manage the fields and memory associated with this organizational hierarchy for receiving, storing and reassembling data packet fragments. The disclosed method is illustrative only and should indicate the great degree of flexibility with which the designer can control data packet and packet fragment transmissions in accordance with the method of the present invention.

What is claimed is:

1. A packet switching system for receiving and reassembling fragmented data packets as communicated via a radio frequency channel includes a microprocessor controller coupled to a data network for performing transmission control of data packets and a packet switch, coupled to the controller, for performing data packet switching, said packet switching system comprising:
   a radio receiver for receiving a packet communicated from a data packet source, said packet having a control data portion and a message data portion;
   the packet switch, coupled to the radio receiver, for determining whether the received packet is one of a plurality of associated packet fragments requiring reassembly, based upon the control data portion of the received packet; and
   a reassembly device, coupled to the packet switch, for combining the message data portions of said plurality of associated packet fragments into a data packet.

2. The packet switching system of claim 1 wherein said packet switch further comprises:
   control memory;
   data memory;
   a memory interface device, coupled to the control memory, for storing at least a portion of the received packet's control data in selected locations within control memory;
   said memory interface device, further coupled to data memory for storing the received packet's message data in selected locations within data memory as determined by the stored control data and for creating a bit map within data memory for tracking the reception of each one of the plurality of associated packet fragments requiring reassembly.

3. The packet switching system of claim 2 wherein said packet switch further comprises:
   a plurality of data memory data buffers;
   means, coupled to data memory, for storing the message data portion of a packet requiring reassembly in one of the plurality of data buffers; and
   means, coupled to data memory, for storing in control memory, a pointer to the data buffer in data memory and storing the message data portion of a packet requiring reassembly.

4. The packet switching system according to claim 2 wherein the bit map is stored in a data memory location, as a function of a control memory pointer.

5. The packet switching system of claim 1 further comprising means, coupled to the reassembly device, for identifying the data packet to which the received packet fragment is associated.

6. The packet switching system of claim 1 further comprising means, coupled to the combining means, for a reassembled data packet without duplicating the message data portion of each associated packet fragment into a different memory location.

7. The packet switching system of claim 1 wherein the combining means further comprises means for reassembling the message data portions of a plurality of associated packets fragments associated with a plurality of different data packets, simultaneously.

8. The packet switching system of claim 1 wherein the combining means further comprises means for reassembling the message data portions of a plurality of associated packet fragments from a plurality of different packet source devices, simultaneously.

9. The packet switching system of claim 1 further comprising: means for informing the microprocessor controller when a first packet fragment associated with a data packet requiring reassembly is received; means, coupled to the informing means, for determining when all packet fragments associated with that data packet are received; and means, coupled to the determining means, for informing the microprocessor controller when reassembly is complete.

10. The packet switching system of claim 1 further comprising: means, coupled to the determining means, using packet level block addressing for defining selected locations within data memory for storing the message data portion of a packet not requiring reassembly; and means, coupled to the defining means, for transmitting only the message data stored at said selected locations within data memory, without performing an intermediate step of duplicating the stored message data into a different memory location.

11. In a packet switching system including a microprocessor controller coupled to a data network for performing transmission control of data packets, and a packet switch coupled to the controller for performing packet switching, a method for performing reassembly of fragmented data packets as communicated over a radio frequency channel comprising the steps of:
   receiving a packet as communicated over a radio frequency channel from a packet source device, said received packet having a control data portion and a message data portion;
   determining whether the received packet is one of a plurality of packet fragments comprising a data packet requiring reassembly;
   informing the microprocessor upon receipt of a first packet fragment associated with any data packet requiring reassembly;
   determining when all of the plurality of packet fragments comprising the data packet requiring reassembly have been received;
   combining the message data portions of said plurality of packet fragments comprising the data packet requiring reassembly to recreate the data packet; and
   upon completion, informing the microprocessor that reassembly is complete.

12. The method of claim 11 further comprising the steps of:
   transmitting a reassembled data packet without duplicating the message data portions of each associated packet fragment into a different memory location.

13. The method of claim 11 further comprising the steps of:

storing at least a portion of a packet's control data in selected locations within control memory as determined by a control memory structure;

storing the message data portion of each packet fragment in selected locations within data memory;

storing an address for each selected location within data memory in control;

assigning a packet address block for each received packet not requiring reassembly;

defining selected locations within data memory as a function of packet level block addressing for storing the message data portion of a packet not requiring reassembly; and transmitting only the message data stored at said selected locations within data memory, without performing an intermediate step of duplicating the message data into different memory locations.

* * * * *

UNITED STATES PATENT AND TRADEMARK OFFICE
CERTIFICATE OF CORRECTION

PATENT NO. : 5,396,490
DATED : March 7, 1995
INVENTOR(S) : White et al.

It is certified that error appears in the above-indentified patent and that said Letters Patent is hereby corrected as shown below:

Col. 13, line 4, "a packet's" should be --a received packet's--.

Signed and Sealed this

Second Day of January, 1996

Attest:

BRUCE LEHMAN

Attesting Officer

Commissioner of Patents and Trademarks